United States Patent [19]

Germond

[11] Patent Number: 4,643,784

[45] Date of Patent: Feb. 17, 1987

[54] APPLICATION AND REPAIR METHOD FOR VENEER AND THE LIKE

[76] Inventor: Michel Germond, 78 Quai de l'Hôtel de Ville, 75004 Paris, France

[21] Appl. No.: 800,325

[22] Filed: Nov. 21, 1985

[30] Foreign Application Priority Data

Nov. 22, 1984 [FR] France ................................ 84 17778

[51] Int. Cl.$^4$ ................................................ B32B 35/00

[52] U.S. Cl. ...................................... 156/98; 144/330; 144/332; 156/94; 156/152; 156/241; 156/247; 156/249; 156/344; 428/63; 428/67

[58] Field of Search .................. 144/330, 332; 156/63, 156/94, 98, 152, 234, 240, 241, 247, 249, 344; 428/63, 67

[56] References Cited

U.S. PATENT DOCUMENTS

| | | | |
|---|---|---|---|
| 2,949,689 | 8/1960 | Vida | 156/241 X |
| 3,150,022 | 9/1964 | Vida | 156/241 X |
| 3,385,743 | 5/1968 | Backberg . | |
| 4,221,620 | 9/1980 | Milne | 156/152 X |

FOREIGN PATENT DOCUMENTS

| | | |
|---|---|---|
| 0088005 | 9/1983 | European Pat. Off. . |
| 2413051 | 10/1975 | Fed. Rep. of Germany . |
| 2507854 | 9/1976 | Fed. Rep. of Germany . |
| 3011171 | 10/1981 | Fed. Rep. of Germany . |
| 2463010 | 2/1981 | France . |

*Primary Examiner*—Robert A. Dawson
*Attorney, Agent, or Firm*—Perry Carvellas

[57] ABSTRACT

A method of applying and repairing veneers and the like comprises the following steps:

sticking a sheet to the outside surface of the veneer;

unsticking the veneer from its support;

sticking the sheet to a substantially rigid transparent plate;

repairing the veneer and then resticking it to its original support.

For applying a previously made up mosaic coating, a transparent temporary support plate is used enabling the composition to be offered up for visual inspection prior to final fixing.

21 Claims, No Drawings

APPLICATION AND REPAIR METHOD FOR VENEER AND THE LIKE

BACKGROUND OF THE INVENTION

1. Field of the invention

The present invention concerns the application and repair of veneers and the like, in particular marquetry, mosaics, tiles, inlays, etc.

2. Description of the prior art

An object of the invention is the repair or restoration of elements applied to an object of any kind without subjecting them to any kind of deterioration, so that where necessary they may be thereafter replaced on any form of support in substantially identical manner.

Another object of the invention is a method of applying mosaic coverings to supports of all kinds.

It is well known to separate various forms of covering, including wallpaper, upholstery fabric, veneer, and so on, from a support, as by unglueing, for example. To this end use is generally made, individually or in combination, of mechanical means such as spatulas, chisels and the like and/or agents for diluting, expanding or dissolving the adhesive used to fix such coverings to their support, for example steam or acqueous, water-alcohol, organic or other solutions or suspensions.

Such processes generally cause a more or less evident change in the covering, sometimes its more or less complete destruction; this is the case with wallpaper, for example.

To avoid such damage it is also known, in the case of veneers that are to be recovered, for example, to bond some form of sheet to them before they are unglued from their support.

While the glueing on of these sheets normally provides sufficient bonding to maintain the cohesion of the various parts of the veneer, it does have the practical disadvantage of hiding more or less completely the outer face of the veneer. Such unglueing is often necessary in order to restore such veneers and/or their support. For example, when restoring inlaid furniture, especially antique furniture, it is essential in such cases to be able to detech these veneers and/or inlays from their support, without risk of causing them any damage, in practice alterations to and/or relative displacement of the various elements constituting them; on the other hand, the veneers and/or inlay recovered in this way must more often than not be restored before being replaced on a support which is usually the original item of furniture itself, which has generally been restored in the meantime.

As is known, in such cases restoration of these veneers and/or inlays is carried out in whole or in part on the inner face. To this end there will be carried out operations known in themselves, including making up worn and/or damaged thicknesses by glueing on pieces of veneer and/or inlay, filling in, etc.

For such operations to be carried out correctly, it is essential that the inner and outer faces both remain visible during the corresponding work.

It is also necessary that the veneer and/or inlay be carefully supported on a temporary support which is sufficiently rigid to prevent any deformation and/or displacement of the elements constituting it.

It is also necessary to be able to solidify the various adhesive agents used during such operations under optimum conditions; for example, to be able to dry the glues used quickly.

One advantage of the present invention is to permit the restoration of veneers and/or inlays deposited on their support by effecting the relevant operations in visible manner on their inner face and where necessary outer face.

Another advantage of the present invention is to retain the veneers and/or inlays removed from their support carefully applied throughout such operations to a flat transparent temporary support plate which is sufficiently rigid to avoid any deformation and/or any displacement of the various elements constituting them.

The rigidity of this plate nevertheless does not exclude a certain degree of flexibility making it possible to carry out all the manipulations necessary for the various operations of the invention, without risk of splintering or breaking.

A supplementary advantage of the invention is to permit relatively rapid solidification of the adhesive agents used during said operations, such as drying of glues used for this purpose, for example.

SUMMARY OF THE INVENTION

The invention consists in a method of restoring a plurality of elements constituting the partial or total covering of a support object, such as an object of art or item of furniture, which method comprises in combination the following principal operations:

- establishing continuous bonding of all or part of said elements by means of an adhesive transparent bonding sheet;
- separating said sheet supporting said elements from said support object;
- temporarily fixing said sheet to a transparent support plate;
- carrying out restoration of said support object;
- depositing an adhesive substance on at least the parts of the support object corresponding to the positions of said elements;
- replacing said elements temporarily secured on the support plate at their position on said support object;
- definitively fixing said elements to said support object;
- separating said temporary support from said elements.

In accordance with one preferred embodiment of the invention said method of repairing or restoring elements such as inlays and/or veneers made up of elements of wood, enamel, ivory, horn, metal and/or stone, applied to any form of support, comprises in combination the following principal operations:

- assuring continuous and substantially indeformable bonding of said elements by glueing a transparent sheet to their outer face,
- detaching the inner face of said elements thus secured from their support,
- placing said elements on a substantially rigid transparent plate, the transparent sheet securing them being totally in contact with said plate, said sheet and/or plate being coated with glue beforehand,
- placing said plate thus supporting said elements in a press,
- covering the inner face of said elements with a layer of a pressure deformable material,
- making said sheet adhere to said plate by drying said glue under pressure.

The various elements normally constituting the veneer and/or inlay which are thus fixed to a support plate can then be subjected to all the required operations necessary for their repair and/or restoration, in a way that is visible to the operative, just as much on the inner face side as on the outer face side, where, with regard to the outer face, such repair has not been undertaken beforehand.

To this end and in accordance with one preferred embodiment of the invention, the transparent securing sheet applied to the outer face consists of a homogeneous fine paper, such as Japanese paper, for example, and the glue employed is a neoprene glue known per se.

Likewise, said substantially rigid transparent support plate, which is preferably a few millimeters thick, consists of a thermoplastic synthetic material such as polystyrene, for example.

In accordance with the invention this plate is preferably perforated beforehand in order to facilitate elimination of constituents of the glue that evaporate during the operation of drying under pressure.

When the constituent elements of the veneer and/or inlay are disposed in substantially the same plane, use may be made in accordance with the invention of a substantially plane plate normally and commercially available as such that it will suffice if necessary to perforate as stated hereinabove and to cut out as and where required.

If, on the other hand, these elements are not disposed in substantially the same plane, then it is necessary to confer on said plate a shape virtually identical to that of the support on which they are applied; this also constitutes an object of the present invention.

In accordance with one preferred embodiment of the invention, any method known per se is used to take a casting of the object with which the inner face of said elements was in contact; this surface will preferably have been restored beforehand. Also, there is disposed between this surface and the casting a sheet the thickness of which is substantially equal to that of the elements constituting said veneer and/or inlay, this sheet being preferably of a relatively flexible and malleable material such as cork or silicone rubber. By way of example, said casting may consist either of plaster or of silica impregnated with resin.

A replica of the object supporting said elements is then made by heat forming said transparent substantially rigid plate on said casting from sheet thermoplastic material.

In this way the surface of this plate which will have to support said elements, secured by the transparent bonding sheet, will have substantially the same shape as the support to which they were originally applied. Said casting will then serve as a support for this plate during the various operative phases of the method in accordance with the invention.

All or some of the constituent elements of the veneer or inlay may, where necessary, be repaired as a preliminary operation, this also constituting an object of the present invention; this applies, specifically but not exclusively, in the case of metal elements constituting so-called buhl inlay.

In this case, these elements are first removed from their support object, in order to be separately subjected to the various restorations necessary, known per se, and including, for example: degreasing, cleaning, drying, annealing, etc. They are then simply replaced in position on their support object, without being fixed to it.

These restored elements, correctly positioned and generally disposed in substantially the same plane, are then temporarily fixed to a transparent plate or sheet so as to link them together perfectly through their outer face, so that they may then be again removed from their support object while retaining them strictly in position relative to one another, in accordance with their original composite structure.

The other elements of the veneer or inlay, and the support object itself, may then be subjected to any restoration operation according to the present invention. Following same, said elements in this way provisionally secured by fixing to a transparent plate or sheet are definitively returned to their place and glued to their support object.

In accordance with one preferred embodiment of the invention, a continuous sheet is disposed between said substantially rigid transparent plate and the press plate in order to prevent the surface of this transparent plate being damaged during the operation of drying under pressure.

Use will preferably be made of a sheet of polytetrafluorethylene (PTFE) or any other known material with substantially equivalent specifications, in particular with regard to non-stick properties.

The material constituting the pressure deformable layer, placed in accordance with the invention over the inner face before carrying out the operation of drying under pressure, is made of cork or any other known material with substantially equivalent flexibility and deformability characteristics under the same conditions, such as silicone rubber, for example.

In accordance with one preferred embodiment of the invention a continuous sheet is placed between the inner face and said layer in order, on the one hand, to avoid any risk of this layer impregnating the inner face and, on the other hand, to facilitate separating them after the operation of drying under pressure.

Use will preferably be made of a sheet based on viscose or any other known material with substantially equivalent mechanical characteristics under the same conditions of use.

After pressure bonding of the constituent elements of the veneer and/or inlay to the substantially rigid transparent plate, the thus constituted assembly of said plate and said affixed elements is then removed from the press in order to be able to carry out on said veneer and/or inlay all the repair and/or restoration operations necessary, as described hereinabove.

The transparent plate will then enable the operator to carry out these operations while easily and visually following and checking them, on both the inner and outer faces of the veneer or inlay.

The rigidity and substantially indeformable nature of this plate will also enable the operator to carry out the corresponding tasks without risk of displacing the various elements constituting the veneer and/or inlay relative to one another.

As the tasks of making good thicknesses as described hereinabove generally comprise operations of glueing on pieces of veneer and/or inlay, it is normally important to be able to maintain all of said veneer and/or inlay carefully applied against said plate throughout the time necessary not only for carrying out this work but also for drying of the adhesive agents or glues used, the working area alone being left accessible to the operator during said work.

The applicant has developed specific devices which also constitute an object of the present invention, these devices consisting in practice of blocks which feature on the side to be placed in contact with the inner face a plurality of rigid projecting elements. The weight of these blocks is sufficient to maintain the part of the veneer or inlay that they cover in excellent contact with said plate; the hardness of the rigid elements bearing on the inner face is such that they are not able to damage them.

A plurality of such blocks, combined where necessary with perforations in said plate as described hereinabove, will facilitate the elimination of volatile constituents of the adhesive agents, water in the glue in particular.

Once the repair or restoration operations have been completed, the constituent elements of the veneer and/or inlay are then replaced on their original support, normally the object or item of furniture which itself has generally been repaired or restored. As the method in accordance with the invention has enabled all the relevant operations to be undertaken without these elements having to be subjected to any significant displacement or modification relative to their original disposition, they will thus be replaced on their support in such a way that said object or furniture will be perfectly repaired or restored and will become virtually identical to its original condition.

EXAMPLES

The following examples illustrate by way of non-limiting example the process in accordance with the present invention.

EXAMPLE 1

Restoration of one side panel of a LOUIS XV commode belonging to the Chateau de Champs-sur-Marne.

A sheet of Japanese paper is glued over the inlay covered with old varnish on the surface to be restored using a neoprene glue, and then the veneer to be restored, supported in this way by the Japanese paper, is unstuck and removed.

After repairing splits in this bared side of the commode and finishing off flush, a sheet of cork the thickness of which is substantially the same as that of the removed inlay is glued to this surface.

After coating this sheet of cork with a thin film of viscose, which is transparent and impermeable, a casting of this side of the commode to be restored is taken using silica impregnated with a heat-hardenable synthetic resin.

A 1.5 mm sheet of transparent polystyrene is then heat formed over the casting thus obtained.

Using a white water-based glue there is glued over this heat formed transparent plate conforming to the side of the commode to be restored the sheet of Japanese paper supporting the removed inlay, this glueing being carried out at raised temperature and under pressure.

All the necessary restoration operations are then carried out on the inner face of this inlay.

Following repairs, the inlay is replaced on the surface of the commode, itself restored. To do this, the inner face of the inlay is glued to the commode, holding it carefully in position throughout the time necessary for the glueing, by applying sufficient pressure through the casting, which is held against the heat formed plate supporting the inlay. After this, the plate and then the sheet of Japanese paper are unstuck and removed.

After cleaning and restaining of the elements of the inlay thus replaced, the commode is given a finishing waxing treatment.

EXAMPLE 2

Restoration of buhl inlay

After cleaning off the varnish covering the part of the inlay to be restored, the brass elements only of the inlay are removed.

The locations of these elements on the furniture are carefully cleaned with a rye flour paste to remove the glue used to fix to it said brass elements.

After heat annealing these brass elements using a torch, in order to restore their malleability, followed by ultrasonic cleaning, these elements are straightened by pressure on a marble slab, their inner face side being in contact with the marble.

These brass elements are then temporarily replaced in their positions in the inlay remaining attached to the furniture.

A perforated transparent polystyrene sheet 1.5 millimeters thick is placed over the part of the inlay containing these brass elements, the side destined to support these elements having been coated with a fine transparent self-adhesive binding sheet, previously coated on both sides with an adhesive substance.

By applying slight pressure the brass elements are made to adhere to the support plate, without being able to move laterally relative to one another, and these elements when attached to the support plate are removed again from the remainder of the inlay remaining attached to the furniture. By applying progressive pressure continued adherence of these elements to the support plate is achieved.

After filling certain holes in the inlay using a fish glue, kaolin and natural pigment coating, the brass elements are reglued to their position on the inlay.

After this, the support plate with its fine self-adhesive film is unstuck and the surface of the inlay thus restored is polished and then varnished using a cotton wad.

The invention now having been described in terms of its application to the restoration of veneers and/or inlays, in particular on furniture, it remains to describe a development which has proved of unexpected benefit in the application of mosaic and analogous coatings to any form of support.

In the currently known technique panels of mosaic are assembled in the factory by glueing to a temporary support, generally consisting of a sheet of kraft paper. As this temporary support is opaque, it prevents visual inspection of the configuration of the coating obtained.

The application of the technique in accordance with the invention to the making up of mosaic panels essentially consists in the use of a temporary support plate which is both flexible and rigid of the kind previously described, transparent or translucent and adapted to conform to the surface to be coated of a support object.

A mosaic previously made up on a working surface may then be taken up in its final configuration for application to it of a support plate of this kind previously coated with glue, in order to be offered up to the area to be covered.

Final application may thus take place after visual inspection of the decoration determined by the varying rhythms in shapes and colors of the elements held assembled together and left visible on their outer faces.

Following definitive fastening to the surface to be covered the temporary support plate is removed and may be recovered after cleaning off the binder.

This technique is thus adapted to facilitate the work of the professional and the decision of the client.

I claim:

1. Method of restoring a plurality of elements constituting the partial or total covering of a support object, such as an object of art or item of furniture, comprising in combination the following principal operations:

establishing continuous bonding of all or part of said elements by means of an adhesive transparent bonding sheet;

separating said sheet supporting said elements from said support object;

temporarily fixing said sheet to a transparent support plate;

carrying out restoration of said support object;

depositing an adhesive substance on at least the parts of said support object corresponding to the positions of said elements;

replacing said elements temporarily secured on said support plate at their position on said support object;

definitively fixing said elements to said support object;

separating said temporary support from said elements.

2. Method according to claim 1, wherein said elements are previously removed in whole or in part from their support object, separately repaired and then replaced in position on their support object.

3. Restoration method according to claim 1 applied to elements applied to a support object, such as inlays and/or veneers made up of elements of wood, enamel, ivory, horn, metal and/or stone, comprising in combination the following main steps:

assuring continuous and substantially indeformable bonding of said elements by glueing a transparent sheet to their outer face, detaching the inner face of said elements thus secured from their support, placing said elements on a substantially rigid transparent plate, the transparent sheet securing them being totally in contact with said plate, said sheet and/or plate being coated with glue beforehand, placing said plate thus supporting said elements in a press, covering the inner face of said elements with a layer of a pressure deformable material, making said sheet adhere to said plate by drying said glue under pressure.

4. Method according to claim 3, wherein said elements are replaced on their original support, restored, by bonding their inner face to this support, the transparent plate is unstuck from the transparent film and said film is removed.

5. Method according to claim 3, wherein a film is disposed between the inner face of said elements and said layer of deformable material.

6. Method according to claim 3, wherein a film is placed between the plate of the press and said transparent plate.

7. Method according to claim 3, wherein said transparent plate is perforated.

8. Method according to claim 3, wherein said transparent plate is of a thermoplastic synthetic material.

9. Method according to claim 3, wherein said transparent sheet securing said elements is of paper.

10. Method according to claim 9, wherein said sheet is of a Japanese paper.

11. Method according to claim 3, wherein said pressure deformable material is cork.

12. Method according to claim 5, wherein said film is based on viscose.

13. Method according to claim 6, wherein said film is of polytetrafluorethylene (PTFE).

14. Method according to claim 3, wherein the outer face of the veneer or inlay has been partially or totally restored previously to its separation from its original support object.

15. Method according to claim 3, wherein the veneer or inlay is restored after glueing it to the transparent plate and before replacing it on its original support.

16. Method according to claim 15, wherein during the restoration work undertaken on the inner face of the inlay, the latter is subjected to distributed shape maintaining pressure.

17. Method according to claim 16, wherein said shape maintaining pressure is applied by means of blocks featuring on a bearing surface a plurality or projecting contact elements.

18. Method according to claim 3, wherein said glue disposed between the transparent plate and the transparent sheet is a white water-soluble glue.

19. Method according to claim 1, wherein said transparent plate is a replica of the support of said veneer or inlay made from a casting of the surface of the support object which is normally in contact with the inner face of said veneer or inlay.

20. Method according to claim 19, wherein said plate is obtained by heat forming.

21. Restoration method according to claim 2 applied to elements applied to a support object, such as inlays and/or veneers made up of elements of wood, enamel, ivory, horn, metal and/or stone, comprising in combination the following main steps:

assuring continuous and substantially indeformable bonding of said elements by glueing a transparent sheet to their outer face, detaching the inner face of said elements thus secured from their support, placing said elements on a substantially rigid transparent plate, the transparent sheet securing them being totally in contact with said plate, said sheet and/or plate being coated with glue beforehand, placing said plate thus supporting said elements in a press, covering the inner face of said elements with a layer of a pressure deformable material, making said sheet adhere to said plate by drying said glue under pressure.

* * * * *